June 14, 1960  J. F. ROSENTHAL  2,940,358
IMAGE REVERSING OPTICAL SYSTEM
Filed Aug. 30, 1956  2 Sheets-Sheet 1

INVENTOR.
JOSEPH F. ROSENTHAL
BY Frank A. Steinhilper
ATTORNEY

June 14, 1960  J. F. ROSENTHAL  2,940,358
IMAGE REVERSING OPTICAL SYSTEM

Filed Aug. 30, 1956  2 Sheets-Sheet 2

INVENTOR.
JOSEPH F. ROSENTHAL
BY
ATTORNEY

United States Patent Office 2,940,358
Patented June 14, 1960

2,940,358

IMAGE REVERSING OPTICAL SYSTEM

Joseph F. Rosenthal, Rochester, N.Y., assignor to Haloid Xerox Inc., Rochester, N.Y., a corporation of New York Filed Aug. 30, 1956, Ser. No. 607,180

1 Claim. (Cl. 88—24)

This invention relates to improvements in photographic copying cameras and, particularly, to an improved optical system for such cameras whereby an image to be reproduced on a sensitized surface may selectively be caused to appear in right reading sense or in reverse reading sense, as desired.

In substantially all graphic arts techniques and processes involving the photographic reproduction of a subject, it is common practice to employ a conventional photographic copying camera having a linear optical system wherein a light image of the subject to be reproduced is transmitted through an objective lens and onto a sensitized plate surface. When the sensitized plate employed is a conventional photographic film or plate, the image formed thereon appears inverted and in reverse reading sense.

Although the reverse reading negative image formed in this manner is suitable for use in certain graphic arts applications, other applications require a reproduction formed in direct reading sense. For example, in the "deep etch" copper engraving process it is essential to form a right reading image of the subject to be reproduced on a light sensitive resist that is coated on the copper surface that is to be etched. According to current techniques, this is accomplished by employing a "stripping" base material as the photographic negative material. This material includes a very thin transparent layer containing the negative image that is stripped from its support base during processing and then turned over and laid against a glass plate. When this is done, the glass plate is then pressed against the light-sensitive, resist-coated copper surface and a contact exposure is made to form an image in the proper reading sense on the resist surface.

This procedure is extremely time consuming and requires a great deal of skill in its execution to avoid tearing the thin layer on which the negative image is formed and to avoid dimensional distortion of the image. Obviously, the required direct reading negative image could be formed in the first instance in the camera by making the original exposure through a prism mounted on the camera lens, in the manner employed in photocopy cameras. However, such practice involves extremely accurate positioning of the prism element with reference to the lens. In addition, it is essential that the copy board on which the subject is mounted be tilted through 90° in order that the subject may be in proper position to have its light image transmitted to the prism and into the lens. Such adjustments are time consuming and require expensive equipment that is not practical for installation in most commercial engraving shops.

A further use for right reading reproductions occurs in the field of lithography wherein, in the so-called "two-sided" lithographic reproduction process, both sides of a sheet of paper stock are printed at the same time on a single pass through the press. In machines adapted for this type of work, the plate impression cylinder is twice the diameter of the blanket cylinder and is provided with two plates, one having a direct reading image of the impression that is to be reproduced on one side of the paper stock and the other having a reverse reading image of the impression that is to appear on the other side of the stock. As the impression cylinder is rotated its plates are inked, in normal manner, and the right reading image is transferred to the blanket roll. As the impression cylinder continues to rotate, paper stock is fed between the blanket cylinder and the second plate on the impression cylinder, whereby an image is transferred to one side of the stock from the reverse reading image on the blanket roll by customary off-set lithography and, simultaneously, the impression on the opposite side of the sheet is made by direct lithography from the reverse reading image on the impression cylinder. In order to make plates for such a machine it is obvious that alternate plates must be made in right reading sense and in reverse reading sense, respectively. Such practice not only requires the formation of right reading as well as reverse reading images, but also requires a convenient and economical apparatus for effecting the required changes in camera function during successive operations.

In addition to the foregoing applications, the recent development of the art of xerography has provided a still further need for a photographic copying camera whereby direct reading or reverse reading reproduction of subject images may be made selectively. In the process of xerography, for example, as disclosed in Carlson Patent 2,297,691, issued October 6, 1952, a xerographic plate comprising a photoconductive insulating material on a conductive backing is given a uniform electric charge over its surface and is then exposed to the subject matter to be reproduced, usually by conventional projection techniques. This exposure discharges the plate areas in accordance with the light intensity which reaches them, and thereby creates an electrostatic latent image on or in the plate coating. Development of the image is effected with a finely divided material such as an electroscopic powder that is brought into contact with the photoconductive layer and is held thereon electrostatically in a pattern corresponding to the electrostatic latent image, thereby forming a xerographic powder image. Thereafter, the xerographic powder image formed on the photoconductive layer is transferred to a support material to which it may be fixed by suitable means.

In the basic xerographic process disclosed in the Carlson patent, it is intended to form a positive reproduction (i.e., black on white) of the line image comprising the subject material. To this end, the photographic equipment employed by Carlson comprises a conventional photographic copying camera whereby the line image of the subject is projected directly onto the surface of a xerographic plate by means of a single objective lens. This results in the formation of a positive reverse reading image on the plate, instead of a negative reverse reading image, as in conventional photographic processes. To transfer this positive image to a support material, the support material is superposed on the xerographic powder image formed on the plate and is transferred to the support material by any of several means, usually by electrostatic attraction, while the support material remains in contact with the plate. Upon separation of the support material from the plate, the reverse reading powder image that had been formed on the plate then appears as a right reading image on the support material.

This xerographic method of positive-to-positive image reproduction is employed in many xerographic applications and is in wide commercial use in various types of machines. However, in a number of xerographic applications it is preferable that the image formed on the xerographic plate be right reading instead of reverse reading. Specific examples of this occur in the preparation of paper masters for direct lithographic printing and in the preparation of metal masters for off-set lithographic printing. Inasmuch as the line image formed on a paper master for direct lithographic printing must be in reverse reading sense, it is necessary to perform an intermediate transfer of the image conventionally formed on a xerographic plate in order to have the image appear in the proper reading sense on the paper master. The preparation of metal offset master sheets is complicated by the fact that it is inconvenient to transfer a powder image from the conventional selenium-coated, metal-backed xerographic plate directly to a metal support surface. In order to make the required transfer by current techniques, it is necessary to perform two intermediate transfers of the xerographic powder image to and from flexible insulating support surfaces before the image can be placed on the metal master in the proper reading sense.

Similar problems occur when it is desired to form printed circuit wiring boards by means of xerographic techniques. In such a case it is necessary to transfer the xerographic powder image from the xerographic plate to a copper-clad laminate, thereby requiring a double intermediate transfer of the xerographic powder image, as above, before it can be placed on the laminate in proper reading sense. Obviously, any technique involving successive transfers of a xerographic powder image results in some loss of resolution of the line image to be reproduced, and should be avoided if high quality copy is desired. Although one of the intermediate transfer steps may be eliminated by reversing the reading sense of the original copy, this technique is not always feasible or convenient.

Various other applications in which right reading or reverse reading xerographic powder images are required to be formed on support surfaces could be discussed. However, it is considered that sufficient examples have been given to illustrate the need for a photographic copying camera adapted selectively to form right reading or reverse reading images on a sensitized surface, as desired.

The principal object of the present invention is to improve optical systems for use in photographic copying cameras whereby such cameras may be employed selectively to produce right reading or reverse reading images of subject copy, as desired. A further object is to provide such an optical system that is economical to manufacture and convenient to operate.

These and other objects of the invention are attained by providing a selectively operable image reversing apparatus in the light path of a photographic copying camera whereby a light image may be subjected to a single reversal or to a double reversal in transit from copy board to the focal plane of the camera. By this means the image formed on the focal plane may selectively be made to appear as a right reading or reverse reading image, as desired, in accordance with the requirements of the particular application for which the image is being made. Specifically, this is accomplished in a copying camera having a folded optical system by providing two selectively operable image reflecting elements at a direction changing point in the image light path; one of said image reflecting elements comprising a plane surface reflecting device, whereby a single reversal of the light image is obtained; the other of said image reflecting elements comprising a compound surface reflecting device, whereby a double reversal of the light image is obtained; and by providing means for rendering either of said image reflecting elements effective selectively.

A preferred form of the invention is shown in the accompanying drawings, in which.

Figure 1:
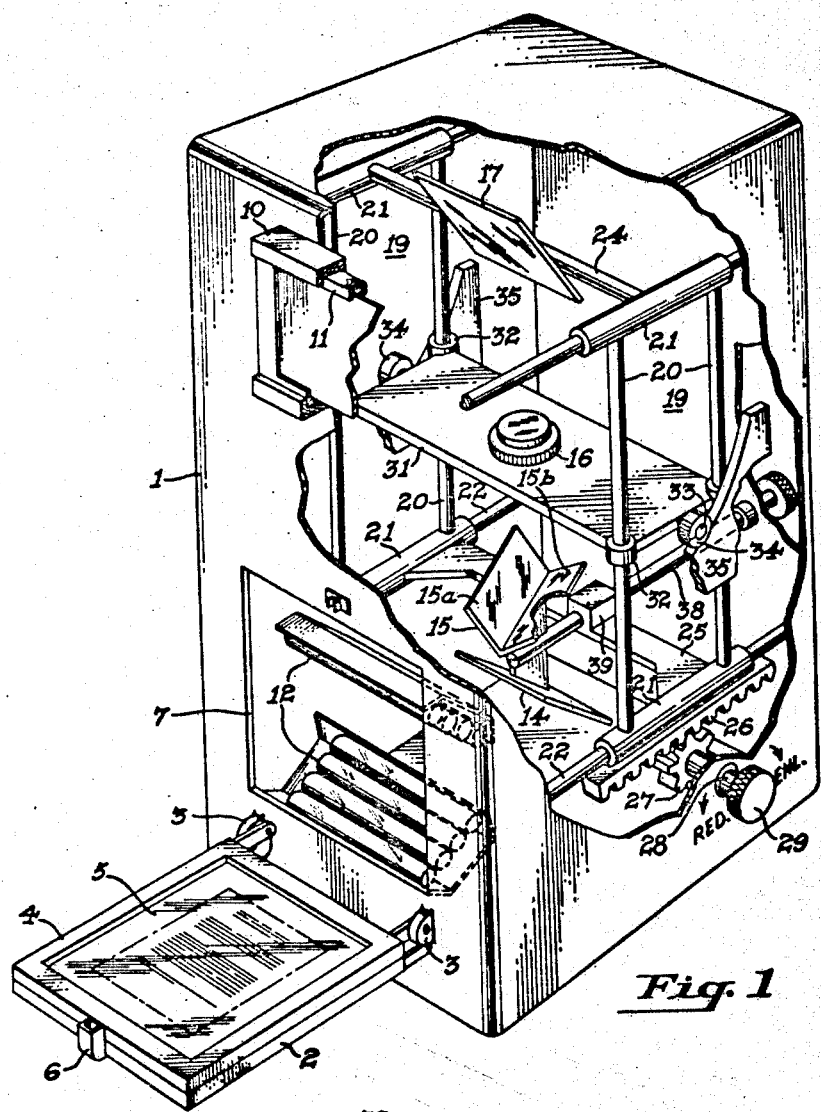
Fig. 1 is an isometric view, partly broken away, of a photographic copying camera embodying the optical system of the invention.
Figure 2:
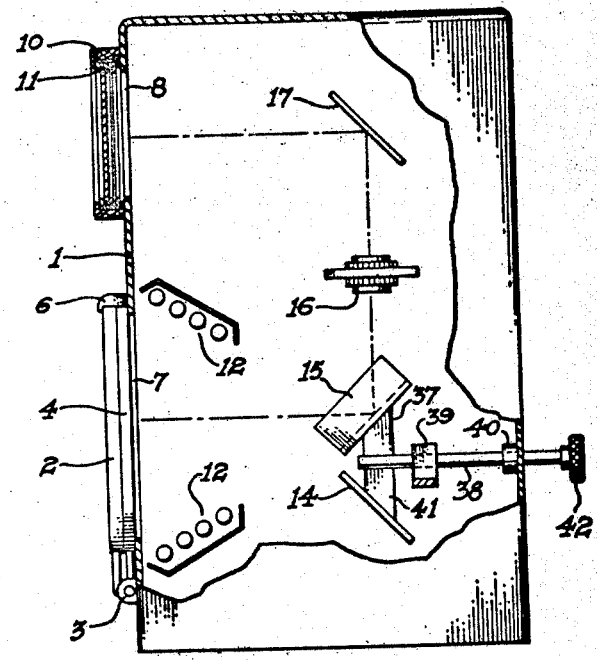
Fig. 2 is a sectional view of the optical system of Fig. 1.

In a preferred form of applicant's device, as shown in the drawings (see Figs. 1 and 2), the invention is embodied in a conventionalized form of photographic copying camera including a light-tight box-like structure 1 that is suitable for mounting on a bench or table and is provided with a folded optical system whereby a copy board and a plate holder may be mounted on one wall of the camera for the convenience of the operator. The copy board 2 is pivotally mounted on brackets 3 secured on the forward wall of the camera and is provided with a hinged copy holding frame 4 having a glass insert 5 for holding subject matter to be reproduced against the copy board. Suitable stops (not shown) may be provided to support the copy board in a substantially horizontal position to facilitate the insertion and removal of copy, and a suitable latch mechanism 6 is provided to lock holding frame 4 against copy board 2 when copy is inserted and to secure the copy board in a vertical position against a rectangular opening 7 in the camera housing during exposure of the subject.

Located in substantially vertical alignment with exposure opening 7 is a rectangular projection opening 8 through which a light image transmitted from the copy is projected onto any suitable sensitized surface that is supported in a plate holding frame 10 secured to the outer face of the forward wall of the camera. Plate holding frame 10 may be adapted to support any photographic, xerographic or other type of plate holder or cassette 11 in a manner to retain the sensitized layer thereof in the focal plane of the camera.

Mounted on the inner face of the forward wall of camera 1 are two banks of fluorescent lamps 12 that serve to illuminate a subject supported on copy board 2 during exposure periods. These lamps are supplied from a suitable source of power (not shown) and may be actuated by an automatic timer to control the length of exposure. The light image reflected from the surface of the copy board is projected substantially horizontally to one of two inclined image reflecting elements 14 and 15, described in detail below, whereby it is reflected upwardly through an objective lens 16 and against a third image reflecting surface 17, whereby the light image is transmitted substantially horizontally against the sensitized surface of the plate held in the focal plane of the camera.

In the particular embodiment shown in the drawings the copying camera includes an arrangement for varying the length of the image light path and automatically making compensating focusing adjustments in the objective lens, whereby to form one-to-one reproductions or progressively decreasing reductions of the copy to be reproduced, as desired. The mechanism for effecting variations in light path length includes two rectangular side frames 19, from which the optical system is supported, that are slidably mounted for forward and rearward movement relative to the forward wall of the camera. Each frame 19 comprises two vertical rod members 20 that are rigidly connected at top and bottom to two horizontal tubular members 21 which, in turn, are mounted on tubular ways 22 that are secured respectively to the forward and rearward walls of the camera. The frames are rigidly connected by spacer bars 24 and 25 which are effective to form the frames into a unitary structure, and which are also effective to support the image reflecting elements of the optical system; element 17 being supported by bar 24, and elements 14 and 15 being supported by bar 25. The entire frame structure may be moved longitudinally in the camera by means of a rack 26, secured to the bottom of tubular member 21 of the right-hand frame, which is actuated by a pinion 27 fixed on a stud shaft 28 that is rotatably mounted in the side wall of the camera and is turned by means of an adjusting knob 29 fixed on the shaft.

The objective lens 16 is mounted in a rectangular lens plate 31 having circular bosses 32 at each corner thereof that are provided with holes encompassing the vertical rods 20 of side frames 19, whereby the lens plate is guided for vertical movement. By this arrangement, the several elements of the optical system are rigidly maintained in vertical alignment for transmitting a light image, although the entire supporting frame structure may be moved longitudinally by means of knob 29 for variously adjusting the magnification ratio of the system.

In order to provide an automatic focusing adjustment for lens 16 to maintain a light image in focus on the focal plane of the camera in each longitudinal setting of optical system, each end of lens plate 31 is provided with a horizontally projecting stud 33 for supporting a roller bearing 34 that functions as a cam follower that rides on the surface of a cam element 35 fixed to the inner wall of the camera. The contour of each cam 35 is so formed that as the optical system is moved forwardly, toward a one-to-one magnification ratio setting, a rearwardly, for progressively decreasing magnification ratios, lens 16 is lowered or raised, respectively, to maintain accurate focus of the light image in each instance. By means of this arrangement there is provided a magnification ratio adjusting apparatus whereby the length of the image light path is varied in accordance with the setting of adjusting knob 29; and objective lens 16 is automatically positioned to effect proper focusing of the light image in the focal plane of the camera.

Figure 3:
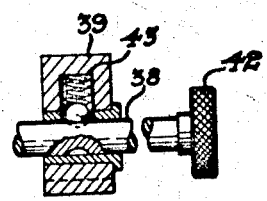
Fig. 3 is a sectional view of a detent mechanism that may be employed with the invention.

Of the image reflecting elements 14 and 15, referred to above, element 14 preferably comprises a plane surface mirror that is mounted at substantially 45° to the horizontal on a supporting bar 37 that is fixed to a shaft 38 rotatably mounted in bearings 39 and 40 that are supported, respectively, by spacer bar 25 and the rear wall of the camera. A second supporting bar 41 fixed on shaft 38 serves to support the second image reflecting element 15 which comprises two plane surface mirrors 15a and 15b mounted to have their reflecting surfaces at an angle of 90° to each other and to have their line of intersection at an angle of 45° to the horizontal. Shaft 38 is provided with an adjusting knob 42 whereby the shaft may be rotated to place the optical center of either image reflecting element 14 or 15 in alignment with the optical axis of the image light path reflected from the copy board. In either effective position of the image reflecting elements, shaft 38 is secured against rotational and longitudinal movement by means of a spring urged detent mechanism 43 (shown in detail in Fig. 3) that is integrally formed on bearing 39 and engages detent notches formed in opposite sides of shaft 38. The rearward portion of shaft 38 is of sufficient length that it may slide longitudinally in bearing 40 in accordance with the positioning of the optical system supporting frame.

By this arrangement, when image reflecting element 14 is positioned in the image light path from the copy board, the light image is transmitted, as in conventional folded optical systems, to form a reverse reading image of the copy in the focal plane of the camera. When image reflecting element 15 is in position in the image light path, the double reflection provided by this element effectively reverses the light image so that a direct reading light image is transmitted to the focal plane. Thus, there is disclosed a device whereby either a right reading or reverse reading image of copy to be reproduced may selectively be transmitted to a sensitized surface, in accordance with the requirements of a given application.

Although the above-described arrangement for mounting reflecting elements 14 and 15 is considered particularly adapted for a photographic copying camera of the type described, it is obvious that various other arrangements may be made for selectively positioning such image reflecting elements. For example, Fig. 4 discloses an arrangement wherein the image reflecting elements 14 and 15 are secured on opposite sides of shaft 44 that is preferably supported in bearings mounted on tubular elements 21 of side frames 19. A detent mechanism 46, similar to that shown in Fig. 3, may be employed to maintain shaft 44 to hold either image reflecting element in its effective position. For purposes of adjustment shaft 44 extends through a longitudinal slot 47 in the side of the camera, and is provided with a manual adjusting knob 48. Slot 47 is provided in order to permit longitudinal movement of shaft 44 in accordance with the positioning of the optical system supporting frame and a suitable light shield 49 is fixed on shaft 44 to prevent ambient light from entering the camera.

Figures 4, 5:
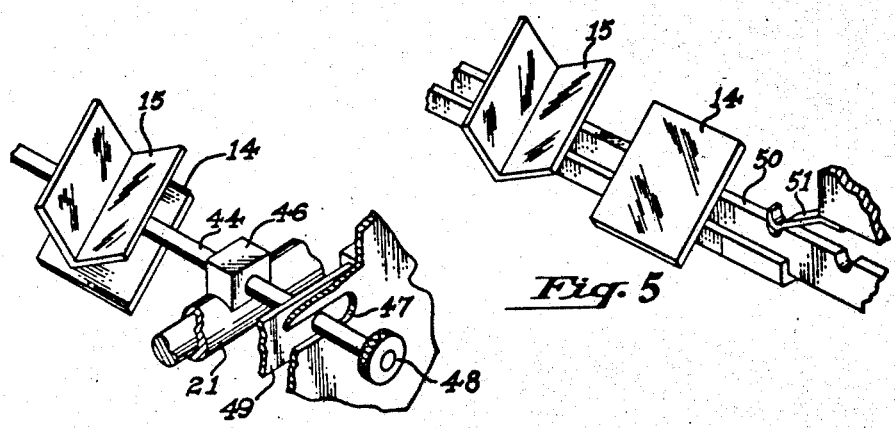
Figs. 4 and 5 illustrate alternate forms of the optical system adjusting means of the invention.

In Fig. 5 there is shown an arrangement in which image reflecting elements 14 and 15 are mounted in side-by-side relation on a slide bar 50 which also is preferably mounted on the optical system supporting frame. A suitable spring detent 51 that is secured to the frame of the camera cooperates with notches in slide bar 50 to effect proper positioning of the image reflective elements relative to the optical axis of the image light path. Slide bar 50 is preferably positioned by a flexible cable (not shown) that may be operated externally of the camera.

In the course of this description, the image reflecting elements 14 and 15 have been described as formed of plane surface mirrors. However, it is apparent that a right angle prism may be employed in place of image reflecting element 14, and that a roof prism may be employed in place of image reflecting element 15 to serve the same respective purpose, in each instance.

Since many changes may be made in the above-described construction and many apparently widely different applications of the present invention may be made without departing from the scope thereof, it is intended that all matter contained in the foregoing description or shown in the accompanying drawings shall be interpreted as illustrative and not in a limiting sense.

What is claimed is:

A copying camera comprising the combination of a light-tight cabinet having a vertical wall member, a rectangular aperture in the upper portion of the wall member, a plate holding frame supported on the exterior surface of the vertical wall member in register with the upper aperture therein, said plate holding frame being adapted to support light-sensitive material in register with the upper aperture, a second rectangular aperture in the lower portion of the vertical wall member, said upper and lower apertures being substantially vertically aligned, a copyboard for supporting subject copy pivotally mounted on the exterior surface of the vertical wall member and movable to a vertical position to support subject copy in register with the lower aperture, a light source for illuminating subject copy supported by the copyboard when in its vertical position, said light source including an array of illuminating devices supported on the interior face of the vertical wall member immediately adjacent the lower aperture therein and arranged to direct substantially uniform illumination on copy supported by the copyboard in register with the lower aperture, and an optical system for transmitting a light image of subject copy from the copyboard to the light-sensitive material selectively in right reading or reverse reading orientation and for variably changing the magnification of the image with respect to the subject copy, said optical system including an objective lens for focusing the light image, a first image reflecting element for causing a single reversal of the light image, a second image reflecting element for causing a double reversal of the light image, each of said image reflecting elements having an effective and an ineffective position and arranged when effective to reflect the light image from the copyboard through the objective lens, a third image reflecting element for receiving the light image from the objective lens and reflecting it to the photosensitive material, means for mounting said objective lens and said reflecting means for movement with respect to the copyboard to thereby vary the magnification of the system, and means operable selectively to place the first or second image reflecting element in the image light path, said last recited means including a shaft rotatably mounted in the cabinet, mounting means fixed on the shaft for supporting the first and second image reflecting elements thereon in back-to-back relation with their optical axes at right angles, said shaft extending through the cabinet and having manually settable means connected thereto exteriorly of the cabinet to rotate the shaft to position the first and second image reflecting elements selectively in their effective and ineffective positions.

References Cited in the file of this patent

UNITED STATES PATENTS

| | | |
|---|---|---|
| 2,166,419 | O'Neill | July 18, 1939 |
| 2,505,505 | Sachtleben | Apr. 25, 1950 |
| 2,525,957 | Schuler | Oct. 17, 1950 |
| 2,571,937 | Peck | Oct. 16, 1951 |

FOREIGN PATENTS

| | | |
|---|---|---|
| 747,220 | Germany | Sept. 15, 1944 |
| 1,052,251 | France | Sept. 23, 1953 |